United States Patent
Bjerrum et al.

(10) Patent No.: US 12,526,322 B2
(45) Date of Patent: Jan. 13, 2026

(54) SECURE USER EQUIPMENT POLICY DATA IN A COMMUNICATION NETWORK ENVIRONMENT

(71) Applicant: Nokia Technologies Oy, Espoo (FI)

(72) Inventors: Bo Bjerrum, Aalborg (DK); Saurabh Khare, Bangalore (IN); Pallab Gupta, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 18/477,807

(22) Filed: Sep. 29, 2023

(65) Prior Publication Data

US 2024/0114057 A1    Apr. 4, 2024

(30) Foreign Application Priority Data

Sep. 29, 2022  (IN) .............................. 202241055845

(51) Int. Cl.
*H04L 9/40* (2022.01)
(52) U.S. Cl.
CPC ............ *H04L 63/20* (2013.01); *H04L 63/102* (2013.01); *H04L 63/126* (2013.01)
(58) Field of Classification Search
CPC ...... H04L 63/20; H04L 63/102; H04L 63/126
See application file for complete search history.

(56) References Cited

U.S. PATENT DOCUMENTS

| | | | |
|---|---|---|---|
| 2019/0116496 A1 | 4/2019 | Catovic et al. | |
| 2019/0116520 A1 | 4/2019 | Chaponniere et al. | |
| 2020/0259904 A1* | 8/2020 | Dao | H04W 40/02 |
| 2020/0359271 A1* | 11/2020 | Lee | H04W 36/1443 |
| 2021/0235266 A1* | 7/2021 | Starsinic | H04W 8/183 |
| 2022/0264370 A1* | 8/2022 | Qiao | H04W 60/00 |
| 2022/0264423 A1* | 8/2022 | Lin | H04W 8/183 |
| 2023/0128763 A1* | 4/2023 | Balmakhtar | H04L 45/306 370/389 |
| 2024/0056815 A1* | 2/2024 | Khare | H04W 12/66 |
| 2025/0016650 A1* | 1/2025 | Phan | H04L 45/302 |

FOREIGN PATENT DOCUMENTS

| | | |
|---|---|---|
| EP | 3691316 B1 | 2/2022 |
| EP | 3656141 B1 | 6/2022 |

OTHER PUBLICATIONS

Office action received for corresponding European Patent Application No. 23199000.3, dated Feb. 24, 2025, 11 pages.

(Continued)

*Primary Examiner* — Oleg Korsak
(74) *Attorney, Agent, or Firm* — Ryan, Mason & Lewis, LLP (57) ABSTRACT

Techniques for managing user equipment policy data in a communication network environment are disclosed. For example, techniques are provided for managing user equipment policy data to be sent to user equipment by protecting the user equipment policy data in a communication network to which the user equipment is subscribed (e.g., a home communication network) such that the user equipment policy data can be sent to the user equipment through a communication network to which the user equipment is attached (e.g., a visited communication network) in a secure manner.

20 Claims, 3 Drawing Sheets

(56) References Cited

OTHER PUBLICATIONS

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"LS on protection of the URSP rules from HPLMN", 3GPP TSG-WG SA2 Meeting #152E e-meeting, S2-2206864, SA2, Aug. 17-26, 2022, 2 pages.

"3rd Generation Partnership Project; Technical Specification Group Core Network and Terminals; 5G System; Secured Packet Application Function (SP-AF) Services; Stage 3 (Release 17)", 3GPP TS 29.544, V17.3.0, Jun. 2022, pp. 1-18.

"3rd Generation Partnership Project; Technical Specification Group Services and System Aspects; System architecture for the 5G System (5GS); Stage 2 (Release 17)", 3GPP TS 23.501, V17.6.0, Sep. 2022, pp. 1-571.

"3rd Generation Partnership Project; Technical Specification Group Services and System Aspects; Procedures for the 5G System (5GS); Stage 2 (Release 17)", 3GPP TS 23.502, V17.6.0, Sep. 2022, pp. 1-748.

"3rd Generation Partnership Project; Technical Specification Group Services and System Aspects; Policy and charging control framework for the 5G System (5GS); Stage 2 (Release 17)", 3GPP TS 23.503, V17.6.0, Sep. 2022, pp. 1-148.

"3rd Generation Partnership Project; Technical Specification Group Services and System Aspects; Study on enhancement of 5G User Equipment (UE) policy (Release 18)", 3GPP TR 23.700-85, V1.0.0, Sep. 2022, pp. 1-147.

Extended European Search Report received for corresponding European Patent Application No. 23199000.3, dated Nov. 14, 2023, 9 pages.

\* cited by examiner

SECURE USER EQUIPMENT POLICY DATA IN A COMMUNICATION NETWORK ENVIRONMENT

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user traffic route selection can present a significant challenge.

SUMMARY

Illustrative embodiments provide techniques for managing user equipment route selection policy data in a communication network environment.

For example, in one illustrative embodiment from a perspective of user equipment, a method comprises receiving data, at the user equipment, from a first communication network to which the user equipment is subscribed, via a second communication network to which the user equipment is attached. The method then verifies, based on a security procedure, that the received data is user equipment policy data protected by the first communication network.

In another illustrative embodiment from a perspective of an authentication function of a communication network, a method comprises receiving a request to protect user equipment policy data to be sent to user equipment subscribed to the communication network, and protecting the user equipment policy data using a security procedure to generate secure user equipment policy data.

In a further illustrative embodiment from a perspective of a policy control function of a communication network, a method comprises sending a request to protect user equipment policy data to be sent to user equipment subscribed to the communication network, and receiving secure user equipment policy data protected using a security procedure.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide techniques for managing user equipment policy data to be sent to user equipment by protecting the user equipment policy data in a communication network to which the user equipment is subscribed (e.g., a home communication network) such that the user equipment policy data can be sent to the user equipment through a communication network to which the user equipment is attached (e.g., a visited communication network) in a secure manner By way of example only, user equipment policy data that can be secured in accordance with illustrative embodiments comprises route selection policy data. However, any user equipment policy data can be securely managed in accordance with embodiments described herein.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501, 23.502, and TS 33.501. Other 3GPP TS/TR documents may provide other details that one of ordinary skill in the art will realize. For example, TS 23.503 entitled, "Technical Specification Group Services and System Aspects; Policy and Charging Control Framework for the 5G System (5GS)," the disclosure of which is incorporated by reference herein in its entirety, may also be mentioned below in the context of some illustrative embodiments. Also, TR 23.700-85, entitled "Technical Specification Group Services and System Aspects; Study on Enhancement of 5G User Equipment (UE) Policy," the disclosure of which is incorporated by reference herein in its entirety, may also be mentioned below in the context of some illustrative embodiments. Still further, TS 29.544 entitled "Technical Specification Group Core Network and Terminals; 5G System; Secured Packet Application Function (SP-AF) Services," the disclosure of which is incorporated by reference herein in its entirety, may also be mentioned below in the context of some illustrative embodiments. However, while well-suited for 5G-related 3GPP standards, embodiments are not necessarily intended to be limited to any particular standards.

It is to be understood that the term 5G network, and the like (e.g., 5G system, 5G communication system, 5G environment, 5G communication environment etc.), in some illustrative embodiments, may be understood to comprise all or part of an access network and all or part of a core network. However, the term 5G network, and the like, may also occasionally be used interchangeably herein with the term 5GC network, and the like, without any loss of generality, since one of ordinary skill in the art understands any distinctions.

Prior to describing illustrative embodiments, a general description of certain main components of a 5G network will be described below in the context of FIGS. 1 and 2.

Figure 1:
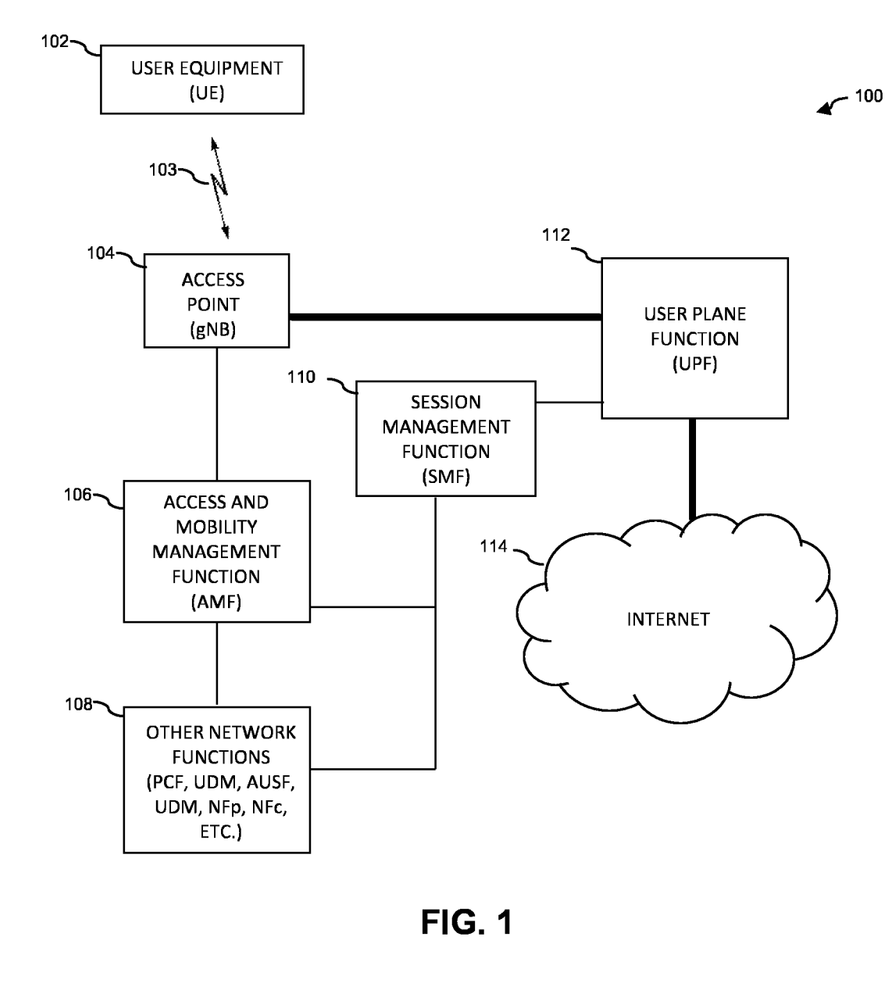
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., control plane functions, user plane functions, etc. As such, the blocks shown in FIG. 1 reference specific elements in 5G networks that provide some of these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5GC network other than a gNB. By way of example only, the access point 104 may be any 5G access network, an untrusted non-3GPP access network that uses an N3IWF (Non-3GPP Interworking Function), a trusted non-3GPP network that uses a TNGF (Trusted Non-3GPP Gateway Function) or wireline access that uses a W-AGF (Wireline Access Gateway Function) or may correspond to a legacy access point (e.g., eNB).

The UE 102 may be a mobile station, and such a mobile station may comprise, by way of example, a mobile telephone, a computer, an IoT device, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one illustrative embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions. Alternative illustrative embodiments may not use UICC-based authentication, e.g., an Non-Public (Private) Network (NPN).

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations.

Further, the access point 104 in this illustrative embodiment is operatively coupled to an Access and Mobility Management Function (AMF) 106. In a 5G network, the AMF supports, inter alia, mobility management (MM) and security anchor (SEAF) functions.

AMF 106 in this illustrative embodiment is operatively coupled to (e.g., uses the services of) other network functions 108. As shown, some of these other network functions 108 include, but are not limited to, a Policy Control Function (PCF), a Unified Data Management (UDM) function, an Authentication Server Function (AUSF), and a User Data Repository (UDR). The PCF is a control plane function within the 5G core (5GC) network that uses policy subscription information to provide policy rule management functionality. In a 5GC network, the 4G function of the HSS (home subscriber server) is split into the AUSF, UDM, and UDR functions. Typically, AUSF authenticates application servers and provides any needed cryptographic keys, while UDR stores the user data and UDM manages the user data.

Other network functions 108 may include network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. Alternatively the UE, such as UE 102, may receive services from an NPN where these functions may reside. The HPLMN is also referred to as the Home Environment (HE). If the UE is roaming (not in the HPLMN), it is typically connected with a Visited Public Land Mobile Network (VPLMN) also referred to as a visited network, while the network that is currently serving the UE is also referred to as a serving network. In the roaming case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein, unless otherwise specified, are not necessarily limited by which functions reside in which PLMN (i.e., HPLMN or VPLMN).

The access point 104 is also operatively coupled (via one or more of functions 106 and/or 108) to a Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the communication system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) are logical networks that provide specific network capabilities and network characteristics that can support a corresponding service type, optionally using network function virtualization (NFV) on a common physical infrastructure. With NFV, network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
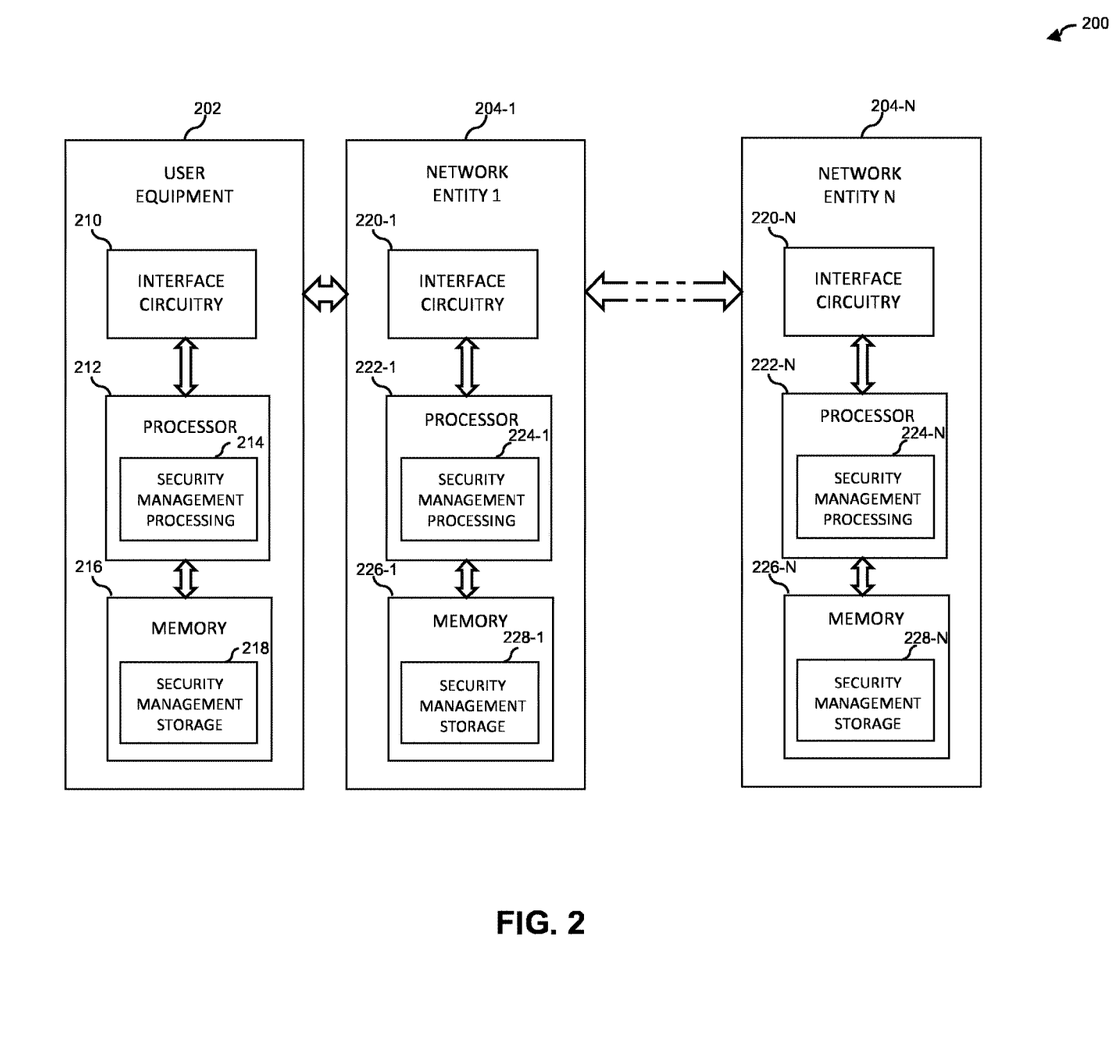
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, tokens, secrets, security management messages, registration request/response messages and data, request/response messages, authentication request/response messages and data, metadata, control data, audio, video, multimedia, consent data, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5GC network architecture as service-based, e.g., Service-Based Architecture (SBA). It is realized herein that in deploying different NFs, there can be many situations where an NF may need to interact with an entity external to the SBA-based 5GC network (e.g., including the corresponding PLMN(s), e.g., HPLMN and VPLMN). Thus, the term "internal" as used herein illustratively refers to operations and/or communications within the SBA-based 5GC network (e.g., SBA-based interfaces) and the term "external" illustratively refers to operations and/or communications outside the SBA-based 5GC network (non-SBA interfaces).

Given the above general description of some features of a 5GC network, problems with existing security approaches in the context of a UE route selection policy, and solutions proposed in accordance with illustrative embodiments, will now be described herein below.

In 5G networks, a UE route selection policy (URSP) includes, inter alia, information that maps user data traffic (e.g., data traffic associated with one or more application programs running on a UE) to one or more session connectivity parameters (e.g., one or more protocol data unit (PDU) session connectivity parameters). More particularly, the URSP comprises one or more rules that are typically used by the UE, inter alia, to determine if a detected application can be associated with an established PDU session, offloaded to non-3GPP access outside a PDU session, or trigger the establishment of a new PDU session. A 5GC network can be configured to connect a UE to one or more external data networks that each may comprise one or more application servers. The connectivity service is referred to as the PDU session. The 5GC network interacts with the one or more application servers via one or more application functions (AFs). Typically, the application server is configured to operate with an application program (i.e., application) resident on the UE. One non-limiting example is a video streaming service scenario wherein the subscriber downloads and views video content from an application server using a video streaming service application loaded on a smart phone or other wireless streaming device (UE) of the subscriber.

However, concerns have been realized with the security of URSP functionalities in the context of roaming scenarios, e.g., as described above, a UE is attached to a visited network (VPLMN) which communicates with the UE's home network (HPLMN) enabling the UE to access an external data network. More particularly, it is realized that a 5G-capable UE can be configured with one or more, but in many cases, a plurality of URSP rules. For example, in accordance with the above-referenced TS 23.503, URSP rules may include definitions of data connection parameters that can identify, for example: (i) the name of the external data network (e.g., Data Network Name, DNN) reachable via the data connection; (ii) a network slice utilized by the data connection (e.g., S-NSSAI); (iii) the radio access network type utilized by the data connection (e.g., 3GPP access or non-3GPP access); (iv) the Internet Protocol (IP) type utilized by the data connection (e.g., IPv4 or IPv6); and/or (v) the session and service continuity type (e.g., SSC type) provided by the data connection. Further, URSP rules are configured to map the different traffic flows generated in the UE into different data connections, each one utilizing different data connection parameters.

In the case of roaming, URSP data (e.g., as illustratively used herein, one or more URSP rules) is sent to the UE from the HPLMN via the VPLMN, i.e., a PCF in the HPLMN (H-PCF) sends the URSP data to a PCF in the VPLMN (V-PCF), and the V-PCF then delivers the URSP data to the UE in the VPLMN.

It has been realized that there is no mechanism available that prevents the VPLMN from modifying the USRP rules provided by the HPLMN. One of the illustrative use cases where the VPLMN may modify the URSP rules is when the VPLMN wants the roaming UE to use local breakout of the traffic so that the VPLMN can generate more revenue from the HPLMN. For example, assume UE1 from PLMN1 (HPLMN) is roaming to PLMN2 (VPLMN). The HPLMN (H-PCF) sends, to the VPLMN (V-PCF), a URSP rule to home-route the traffic of the specific PDU sessions. However, assume that similar services can be provided by the VPLMN as well. Left unprotected, the V-PCF can read and modify the URSP rule. Therefore, when UE1 creates the PDU session, the traffic is not home-routed, but rather it is broken out locally. This may lead to complaints from the user due to unexpected user experience and charging caused by the change in traffic routing rules at the UE side. It is understood that only the HPLMN should provide URSP rules. Therefore, it is realized herein that techniques are needed to ensure that entities (e.g., VPLMN) are not able to modify the content of the URSP rules.

It is realized that the competitor charging use case is not the only example of a use case where an entity might be motivated to modify URSP data sent between the HPLMN and the UE. By way of further example, a malicious actor may modify URSP data to effect an attack that causes the UE to send user data traffic to a destination that is part of the attack or may not otherwise be an intended destination of the user data traffic.

Illustrative embodiments overcome the above and other drawbacks with USRP data security management by providing security techniques to ensure the USRP data (e.g., one or more URSP rules) is not modified (e.g., by competitors and/or malicious actors or other unauthorized entities) when sent from the HPLMN to the UE.

Figure 3:
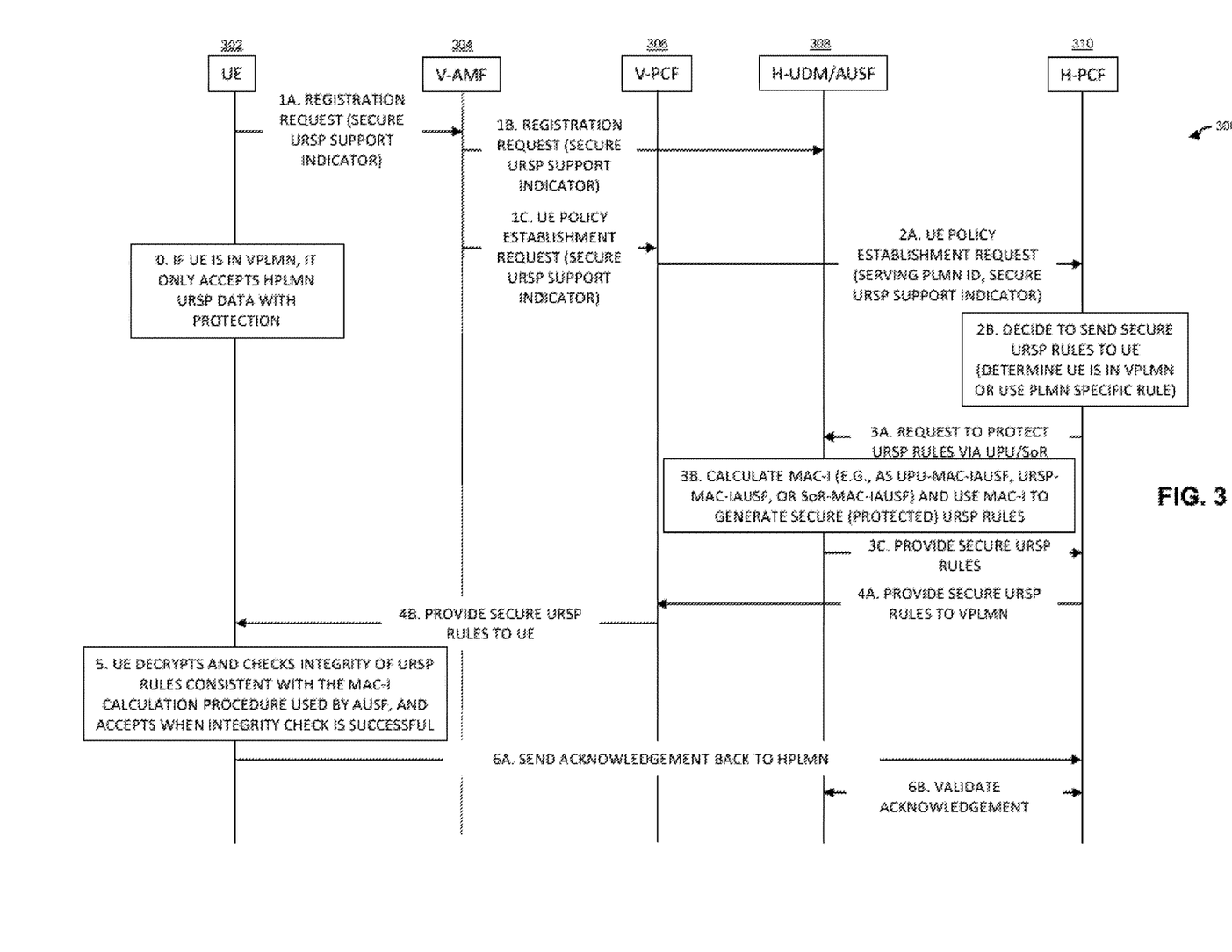
FIG. 3 illustrates a procedure for securing user equipment route selection policy data in a communication network according to an illustrative embodiment.

FIG. 3 illustrates a procedure 300 for securing USRP data in a communication network according to an illustrative embodiment. More particularly, procedure 300 involves a UE 302, a V-AMF 304, a V-PCF 306, a H-UDM/AUSF 308, and a H-PCF 310. Note that "H-" refers to a function(s) in the HPLMN, while "V-" refers to a function(s) in the VPLMN. The following steps of procedure 300 correspond to the numbers labeled in the figure.

Step 0: it is assumed that when UE 302 is in a VPLMN, UE 302 is configured to only accept USRP data from the HPLMN with protection.

Step 1 (1A through 1C): While registering, UE 302 provides to V-AMF 304, in step 1A, a secure URSP support indicator to indicate that it supports secure URSP rules, e.g., the indicator is set to Secure URSP=True. In some illustrative embodiments, the secure URSP support indicator may be provided by UE 302 in a UE policy container or in a 5G MM capability message. In step 1B, V-AMF 304 provides the secure URSP support indicator to H-UDM/AUSF 308 as a part of registration where it is stored. Additionally or alternatively, in step 1C, V-AMF 304 sends the secure URSP support indicator to V-PCF 306 in a UE policy association establishment.

This secure URSP support indicator ensures that recipients are informed that UE 302 supports secure URSP rules.

Step 2 (2A and 2B): V-PCF 206 includes the secure URSP support indicator in the UE policy establishment request sent to H-PCF 310 in step 2A. The UE policy establishment request from V-PCF 306 may also provide the serving PLMN ID (selected by UE 302) and/or an operator policy to H-PCF 310 along with the secure URSP support indicator. In step 2B, H-PCF 310 decides to provide secure URSP rules to UE 302. In some illustrative embodiments, this decision can be based on a determination that UE 302 is in a VPLMN or based on a PLMN specific rule.

Step 3 (3A through 3C): In step 3A, once H-PCF 310 decides to protect the URSP rules (step 2B), H-PCF 310 sends a request to H-UDM/AUSF 308 to protect the URSP rules. In some illustrative embodiments, the UDM part of H-UDM/AUSF 308 forwards the request to the AUSF portion of H-UDM/AUSF 308 to integrity protect the URSP rules. In step 3B, the AUSF portion of H-UDM/AUSF 308 calculates a message authentication code and integrity-protects the URSP rules using the MAC. In illustrative embodiments, the MAC used for integrity protection is referred to as a MAC-I and several illustrative procedures for calculating MAC-I are described below. The AUSF portion of H-UDM/AUSF 308 then returns the secure URSP rules to the UDM portion of H-UDM/AUSF 308, which provides the secure URSP rules to H-PCF in step 3C. Alternatively, H-PCF 310 can directly contact the AUSF portion of H-UDM/AUSF 308 to obtain the secure URSP rules; in which case, the latest AUSF information and AUSF address can be retrieved from the UDM portion of H-UDM/AUSF 308.

Note that the secure URSP rules can also be encrypted in addition to the integrity protection provided by the MAC-I. While encryption keeps messages from being publicly readable, data integrity ensures that the received data is the actual data from the sender and has not been tampered with or modified.

In illustrative embodiments, MAC-I may be calculated (step 3B) in one of several ways. For example:

(i) MAC-I can be calculated with an enhancement, according to an illustrative embodiment, to a UPU-MAC-IAUSF (which itself is defined in the above-referenced TS 33.501). UPU refers to a UE parameters update procedure. More particularly, when deriving a UPU-MAC-IAUSF from a KAUSF, the following parameters are used to form the input S to the key derivation function (KDF):

FC=0x7B
P0=UE Parameters Update Data also containing URSP rules
L0=length of UE Parameters Update Data
P1=CounterUPU
L1=length of CounterUPU The input key is KAUSF. The UPU-MAC-IAUSF is identified with the 128 least significant bits of the output of the KDF.

(ii) MAC-I can be calculated according to an illustrative embodiment as URSP-MAC-IAUSF using a URSP-MAC-IAUSF generation function. More particularly, when deriving a URSP-MAC-IAUSF from a KAUSF, the following parameters are used to form the input S to the KDF:

FC=0xAA
P0=URSP data
L0=length of URSP Data
P1=CounterURSP
L1=length of CounterURSP The input key is KAUSF. The URSP-MAC-IAUSF is identified with the 128 least significant bits of the output of the KDF. In some illustrative embodiments, CounterURSP can be managed same as CounterUPU.

(iii) MAC-I can be calculated according to an illustrative embodiment as an enhanced SoR-MAC-IAUSF. SoR-MAC-IAUSF is defined in the above-referenced TS 33.501. SoR refers to a steering of roaming procedure. More particularly, when deriving a SoR-MAC-IAUSF from a KAUSF, the following parameters are used to form the input S to the KDF:
FC=0x77
P0=SoR header
L0=length of SoR header
P1=CounterSoR
L1=length of CounterSoR
P2=list of preferred PLMN/access technology combinations or secured packet or SoR transparent container
L2=length of list data included in P2
P3=All UE policies or policy sections that include some specific UE policies, e.g. URSP, ANDSP, V2XP, ProSeP or only URSP part within a policy section
L3=length of list data included in P3
The input key is KAUSF.

Step 4 (4A and 4B): H-PCF 310 sends the secure URSP rules to V-PCF 306 (step 4A), and V-PCF 306 delivers the secure URSP rules to UE 302 (step 4B).

Step 5: UE 302 decrypts and validates the integrity of the message by calculating the MAC-I consistent with the MAC-I calculation procedure established by its HPLMN (step 3B in AUSF). If the integrity check fails, meaning that the HPLMN-issued URSP data has been tampered with or otherwise changed, then UE 302 ignores (refrains from applying) the URSP rules and may keep the VPLMN on a lower priority. Otherwise, if the integrity check is successful, UE 302 applies the URSP rules as appropriate.

If an acknowledgement message (ACK) is requested to be sent, then UE 302 prepares the ACK based on one of following illustrative UE-based variations of the MAC-I procedures applied by the HPLMN:

(i) In one illustrative embodiment, a UPU-MAC-IUE generation function as defined in the above-referenced TS 33.501 is used.

(ii) In another illustrative embodiment, a URSP-MAC-IUE generation function as defined herein is used. When deriving a URSP-MAC-IUE from a KAUSF, the following parameters are used to form the input S to the KDF:
FC=0xFF
P0=0x01 (URSP Acknowledgement: Verified the URSP successfully)
L0=length of URSP Acknowledgement (i.e., 0x00 0x01)
P1=CounterURSP
L1=length of CounterURSP
The input key is KAUSF.
The URSP-MAC-IUE is identified with the 128 least significant bits of the output of the KDF.

(iii) In a further illustrative embodiment, an SoR-MAC-IUE generation function as defined in the above-referenced TS 33.501 is used.

Step 6 (6A and 6B): UE 302 sends ACK to H-PCF 310 via V-PCF (step 6A). H-PCF 310 validate ACK via H-UDM/AUSF 308 (step 6B).

It is to be appreciated that while illustrative embodiments describe various procedures and protocols for protecting/securing URSP rules (i.e., URSP data), alternative embodiments may implement other procedures and protocols.

In some illustrative embodiments, as mentioned above in the context of step 1, the secure URSP support indicator sent by UE 302 can itself be protected/secured from tampering by the VPLMN or any other entity. For example, UE 302 can generate a UE capability container that includes its secure URSP capability (secure URSP support indicator), sign it (calculate the MAC as described above), and provide it to the HPLMN. After verification of the MAC, the HPLMN can trust and store the UE capability.

Further, in some illustrative embodiments, along with integrity-protected, URSP rules can be confidentiality-protected as well. For example, a method to confidentially protect SoR containers can be used for URSP as well, e.g., see Secured Packet Application Function (SP-AF) services as defined in the above-referenced TS 29.544.

Thus, it is to be understood that while illustrative embodiments above focus on integrity protection of the URSP rules provided by the HPLMN, alternative embodiments contemplate implementation of any other (or all) UE protection policies including, but not limited to, ANDSP (access network discovery and selection policy) data, V2XP (vehicle-to-everything policy) data, ProSeP (user equipment proximity based services policy) data, etc.

As used herein, it is to be understood that the term "communication network" in some embodiments can comprise two or more separate communication networks. Further, the particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

The invention claimed is:

1. An apparatus comprising:
at least one processor; and
at least one memory storing instructions that, when executed by the at least one processor, cause the apparatus at least to:
send a secure user equipment route selection policy (URSP) support indicator to a first communication network to which the apparatus is subscribed during a registration procedure of the apparatus with a second communication network to which the apparatus is attached, the secure URSP support indicator specifying whether the apparatus supports protection of URSP data utilizing a security procedure, the security procedure specifying integrity protection to be applied to the URSP data;
receive data from the first communication network to which the apparatus is subscribed via the second communication network to which the apparatus is attached, the received data comprising URSP data; and
verify that the received data comprises the URSP data integrity protected by the first communication network utilizing the security procedure.

2. The apparatus of claim 1, wherein the at least one memory stores instructions that, when executed by the at least one processor, further cause the apparatus to:
apply URSP rules in the URSP data when the verifying is successful; and
refrain from applying the URSP rules in the URSP data when the verifying is unsuccessful.

3. The apparatus of claim 1, wherein the URSP data comprises URSP rules.

4. The apparatus of claim 3, wherein the URSP rules specify one or more route connectivity parameters for data traffic associated with the apparatus.

5. The apparatus of claim 3, wherein verifying that the received data comprises URSP data integrity protected by the first communication network utilizing the security procedure comprises verifying an integrity of the URSP rules using a message authentication code.

6. The apparatus of claim 1, wherein the at least one memory stores instructions that, when executed by the at least one processor, further cause the apparatus to:
generate an acknowledgement message;
apply an apparatus-based variation of the security procedure to the acknowledgement message to generate a secure acknowledgement message; and
send the secure acknowledgement message to the first communication network via the second communication network.

7. The apparatus of claim 1, wherein the first communication network comprises a home communication network, and the second communication network comprises a visited communication network.

8. The apparatus of claim 1, wherein the at least one processor and the at least one memory are part of user equipment.

9. An apparatus comprising:
at least one processor; and
at least one memory storing instructions that, when executed by the at least one processor, cause the apparatus at least to:
receive, at a first network entity of a first communication network to which user equipment is subscribed during a registration procedure of the user equipment with a second communication network to which the user equipment is attached, a secure user equipment route selection policy (URSP) support indicator, wherein the secure URSP support indicator specifies whether the user equipment supports protection of URSP data utilizing a security procedure, the security procedure specifying integrity protection to be applied to the URSP data;
receive, from a second network entity of the first communication network, a request to protect URSP data to be sent to user equipment subscribed to the first communication network; and
integrity protect the URSP data using the security procedure specified in the secure URSP support indicator to generate secure URSP data.

10. The apparatus of claim 9, wherein the integrity protection to be applied of the URSP data comprises calculation of a message authentication code.

11. The apparatus of claim 10, wherein the message authentication code is calculated based on at least one user equipment update parameter.

12. The apparatus of claim 10, wherein the message authentication code is calculated based on at least one steering of roaming parameter.

13. The apparatus of claim 10, wherein the message authentication code is calculated based on at least one user equipment policy parameter in the URSP data.

14. The apparatus of claim 9, wherein the at least one memory stores instructions that, when executed by the at least one processor, further cause the apparatus to:
in response to an acknowledgement message generated by the user equipment, perform a validation of the acknowledgement message with the second network entity that sent the request to protect the URSP data.

15. The apparatus of claim 9, wherein the at least one processor and the at least one memory execute an authentication function.

16. An apparatus comprising:
at least one processor; and
at least one memory storing instructions that, when executed by the at least one processor, cause the apparatus at least to:
receive, at a first network entity of a first communication network to which user equipment is subscribed from a second network entity of a second communication network to which the user equipment is attached during a registration procedure of the user equipment with the second communication network, a user equipment policy establishment request comprising a secure user equipment route selection policy (URSP) support indicator, the secure URSP indicator specifying whether the user equipment supports protection of URSP data utilizing a security procedure, the security procedure specifying integrity protection to be applied to the URSP data;
send, from the first network entity of the first communication network to third network entity of the first communication network, a request to protect URSP data to be sent to the user equipment subscribed to the first communication network; and
receive, at the first network entity of the first communication network from the third network entity of the first communication network, secure URSP data that is integrity protected using the security procedure specified in the secure URSP support indicator;
send, from the first network entity of the first communication network to the second network entity of the second communication network, the secure URSP data that is integrity protected using the security procedure specified in the secure URSP support indicator.

17. The apparatus of claim 16, wherein the at least one processor and the at least one memory execute a policy control function.

18. The apparatus of claim 16, wherein the first network entity of the first communication network comprises a first policy control function and the second network entity of the second communication network comprises a second policy control function.

19. The apparatus of claim 18, wherein the third network entity of the first communication network comprises an authentication server function.

20. The apparatus of claim 18, wherein the third network entity of the first communication network comprises a unified data management function.

\* \* \* \* \*